United States Patent
Dik et al.

(10) Patent No.: US 8,856,938 B2
(45) Date of Patent: Oct. 7, 2014

(54) UNVALIDATED PRIVILEGE CAP

(75) Inventors: Casper H. Dik, Amsterdam (NL); John E. Zolnowsky, Milpitas, CA (US); Scott A. Rotondo, Mountain View, CA (US); Joep J Vesseur, Amstelveen (NL)

(73) Assignee: Oracle America, Inc., Redwood City, CA (US)

( * ) Notice: Subject to any disclaimer, the term of this patent is extended or adjusted under 35 U.S.C. 154(b) by 978 days.

(21) Appl. No.: 12/182,790

(22) Filed: Jul. 30, 2008

(65) Prior Publication Data
US 2010/0031355 A1    Feb. 4, 2010

(51) Int. Cl.
G06F 21/00    (2013.01)
G06F 21/64    (2013.01)
G06F 21/57    (2013.01)

(52) U.S. Cl.
CPC .............. *G06F 21/64* (2013.01); *G06F 21/57* (2013.01)
USPC ............................................ 726/26; 713/187

(58) Field of Classification Search
USPC ............ 713/187, 165, 166, 176, 180; 726/22, 726/23, 24, 25, 26, 27, 30
See application file for complete search history.

(56) References Cited

U.S. PATENT DOCUMENTS

| | | | |
|---|---|---|---|
| 6,321,334 B1* | 11/2001 | Jerger et al. | 726/1 |
| 2003/0097581 A1* | 5/2003 | Zimmer | 713/200 |
| 2004/0025015 A1* | 2/2004 | Satterlee et al. | 713/164 |
| 2005/0268115 A1* | 12/2005 | Barde et al. | 713/189 |
| 2007/0174921 A1* | 7/2007 | England et al. | 726/30 |
| 2007/0234330 A1* | 10/2007 | Field | 717/165 |
| 2007/0266373 A1* | 11/2007 | Liu | 717/126 |
| 2008/0168553 A1* | 7/2008 | Kiehtreiber | 726/17 |
| 2010/0070775 A1* | 3/2010 | Dik et al. | 713/187 |
| 2010/0088496 A1* | 4/2010 | Zolnowsky et al. | 712/245 |

OTHER PUBLICATIONS http://www.tux.org/lkml/, "The linux-kernel mailing list FAQ", last updated Nov. 12, 2006, pp. 1-52.

* cited by examiner

*Primary Examiner* — Jeffery Williams
(74) *Attorney, Agent, or Firm* — Brooks Kushman P.C.

(57) ABSTRACT

A method for securely accessing an executable file object includes a step in which a request from the target process to access the executable file object is received by an operating system component, and the object is examined for validity before access is allowed. For objects that cannot be validated, the process is run with privileges bounded by the privilege cap, if the privilege cap permits execution of the object.

8 Claims, 4 Drawing Sheets

UNVALIDATED PRIVILEGE CAP

BACKGROUND OF THE INVENTION

1. Field of the Invention

The present invention relates to operating system related methods for securely accessing an object.

2. Background Art

Computer security remains an area for improvement in the digital age. Of particular concern is the verification of the integrity of software objects prior to the execution of such objects ("validated execution"). Such verification provides assurance that the executable has not been altered, either accidentally or deliberately, since it was released by its publisher.

Prior art techniques exist for performing such validated execution to a somewhat limited degree. In one method, files are compared against a manifest of known valid files. However, this prior art method does not protect against programs that are modified after the comparison but before they are executed.

Accordingly, there exists a need for improved methods of validating files prior to execution.

SUMMARY OF THE INVENTION

The present invention solves one or more problems of the prior art by providing in at least one embodiment a method of securely accessing an executable file object. The method comprises a step of receiving a request from the target process to access the executable file object that is encoded in a computer readable medium and a step of determining if the executable file object is validated. If the executable file object is unvalidated, target process is allowed to execute the executable file object if the privilege cap allows execution of an unvalidated object.

In another embodiment, a computer system implementing the method set forth above is provided.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Reference will now be made in detail to exemplary embodiments and methods of the invention. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular may comprise one or a plurality of components.

The term "executable" refers to a file that is capable of being run as a program on a computer. This definition includes, but is not limited to, binary file representations of machine code and scripts and portions of a program, such as a library.

Figure 1:
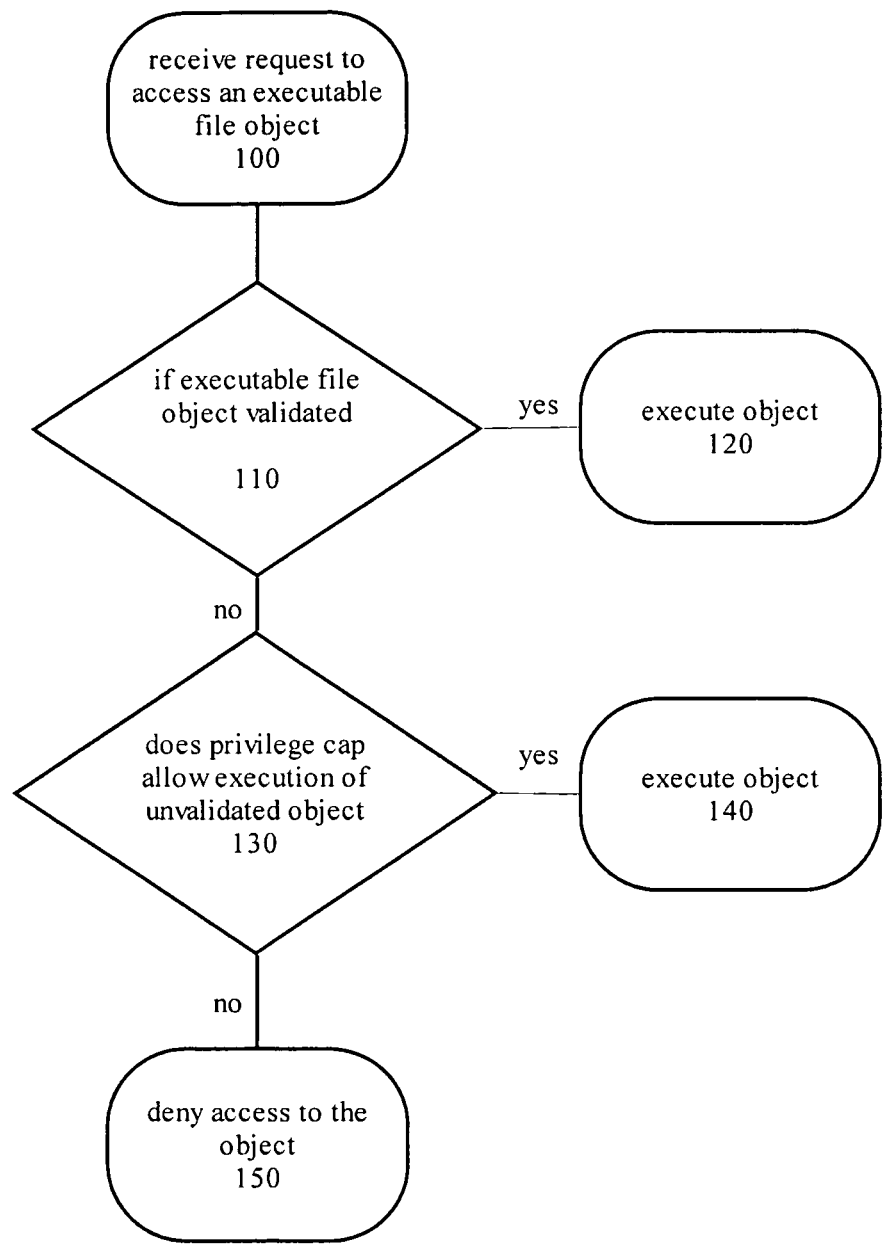
FIG. 1 is a flowchart showing an embodiment of an exemplary embodiment of the invention.
Figure 2:
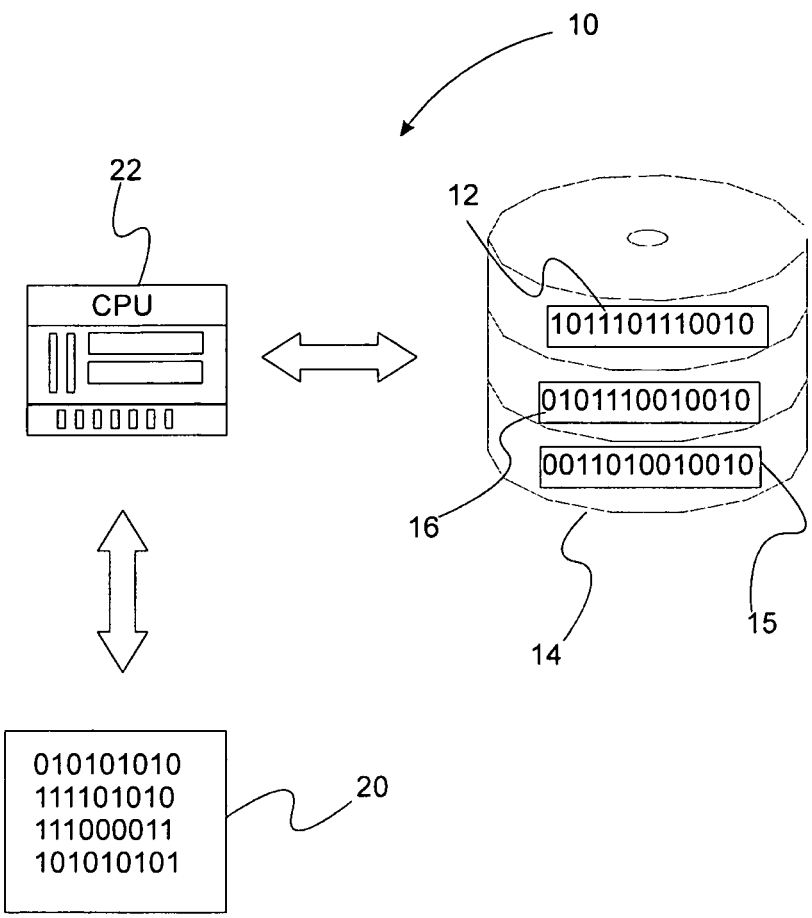
FIG. 2 is a schematic illustration of a computer system implementing the method depicted by FIG. 1.

In one embodiment, a method of securely accessing an executable file object by a target process executing on a computer system is provided. FIG. 1 illustrating this exemplary embodiment. FIG. 2 provides a computer system implementing the invention. Computer system 10 attempts to run process 12 encoded in computer-readable medium 14. In accordance with one embodiment, target process 12 attempts to access executable file object 15, which is also encoded in computer-readable medium 14. Examples of computer readable medium include hard drives, tape drive, flash memory, ROM, RAM, DVD, CDROM, and the like. Computer system 10 has an associated privilege cap. The privilege cap includes a first set of privileges associated with the computer system. The steps of some embodiments are encoded in computer readable medium 14 as software component 16. Prior to execution of the method of some embodiments, the encoded steps for the method are loaded into memory unit 20. One or more computer processors 22 implement these steps usually with the assistance of an operating system component.

In the first step as provided by Box 100, a request from target process 12 to access executable file object 15 is received. In a refinement, an operating system component such as a run-time loader will receive this request. The executable file object is then evaluated to determine whether or not it is validated as shown in decision box 110. If the file is validated, target process 12 is allowed access to the file (Box 120). If the file is unvalidated, a determination is made to evaluate if the privilege cap allows execution of an unvalidated object (Decision Box 130). If the privilege cap allows such execution, target process 12 is allowed access to the file (Box 140). If the privilege cap does not allow such access, target process 12 is denied access to executable object 15 (Box 150). In another refinement, the privilege cap is configurable by a user such as an administrator.

The method of some embodiments allows operating system modules that load and execute code (e.g., kernel and run-time loader) to verify such code before execution. Typically, the executable file object is encoded on a computer readable medium. The executable file object is validated by examining the executable file object. Advantageously, this validation is performed at the time the executable file object is used, thereby avoiding the race condition inherent in solutions that periodically compare files against a known reference.

The method of an exemplary embodiment provides protection against a running computer system becoming compromised. For example, any alteration to the file system is detected the next time the system is booted. Any executable files modified by an attacker will fail to start when the system reboots. Therefore, if an attacker gains privilege by exploiting a vulnerability, the attacker will be forced to do so every time the system is booted rather than leaving behind a "back door" that can be used in the future to gain privileged access to the system.

In a variation of some embodiments, the executable file object is associated with a digital signature. In a refinement, the digital signature is constructed from a one-way hash of the file object contents encrypted with an asymmetric cryptographic key such as RSA or DSA keys. Typically, this key is known only to the publisher of the executable file object. The corresponding public key is used to decrypt the hash value and verify that it matches the file contents. With respect to the Solaris Operating system, ELF-format files typically contain an embedded digital signature. Specific examples of software modules and function calls are to the Solaris Operating System. One skilled in the art of operating system design will readily appreciate the analogous functionality in other operating systems. In another refinement, files (including non-ELF objects such as shell scripts) are provided with a separate digitally signed manifest listing a cryptographic hash for each file.

As set forth above, the method of some embodiments require that the privilege parameters associated with the executable file object be validated. In a variation of some embodiments object validation occurs just prior to running of the executable file object after an attempt by the target process to access the executable file object. In one refinement, this validation is immediate in the sense that it occurs prior to the object being accessed by another process (i.e., a different process than the target process). For example, in a Unix-like files system such as Solaris, such validation of executables occurs in response to operations such as exec( ), mmap( ) with PROT_EXEC, dlopen( ), and loading a kernel module.

In the context of unvalidated objects, the target process attempting to access the executable file object is associated with a permitted privilege set. The permitted privilege set includes a second set of privileges. The target process is denied access to the executable file object if any privilege in the permitted privilege set is not included in the privilege cap and if the executable file object is unvalidated. In a further refinement, the target process is associated with a limit privilege set. The limit privilege includes a third set of privileges that can never be exceeded by the target process. It should also be appreciated that the limit privilege set of a process never gains privileges and that a child process inherits the limit privilege set of its parent. In accordance with some embodiments, the target process executes the executable object with a limit privilege set that is the intersection of the prior value of the target process's limit privilege set and the privilege cap. Prior value means the value such prior to taking the intersection.

The value of the unvalidated privilege cap takes one of two forms. It may specify a privilege set following the normal syntax for privilege sets, or it may be set to the distinguished value noexec, which indicates that the unvalidated executable may not run at all. That is, the target process is denied access to the executable file object if the executable file object is unvalidated. When an attempt is made to load an unvalidated object for execution, the effect is as follows. The operation fails if the unvalidated privilege cap is set to noexec. The operation fails if the process's permitted set exceeds the unvalidated privilege cap. If neither of the above conditions applies, the process's Limit set is intersected with the unvalidated privilege cap. Informally, this means that the privilege cap constrains the maximum privileges available to this program or any of its descendants, as indicated by the process's Limit set, but the Limit set will not be reduced below the Permitted set. Instead, the operation will fail if the Permitted set exceeds the cap.

Figure 3:
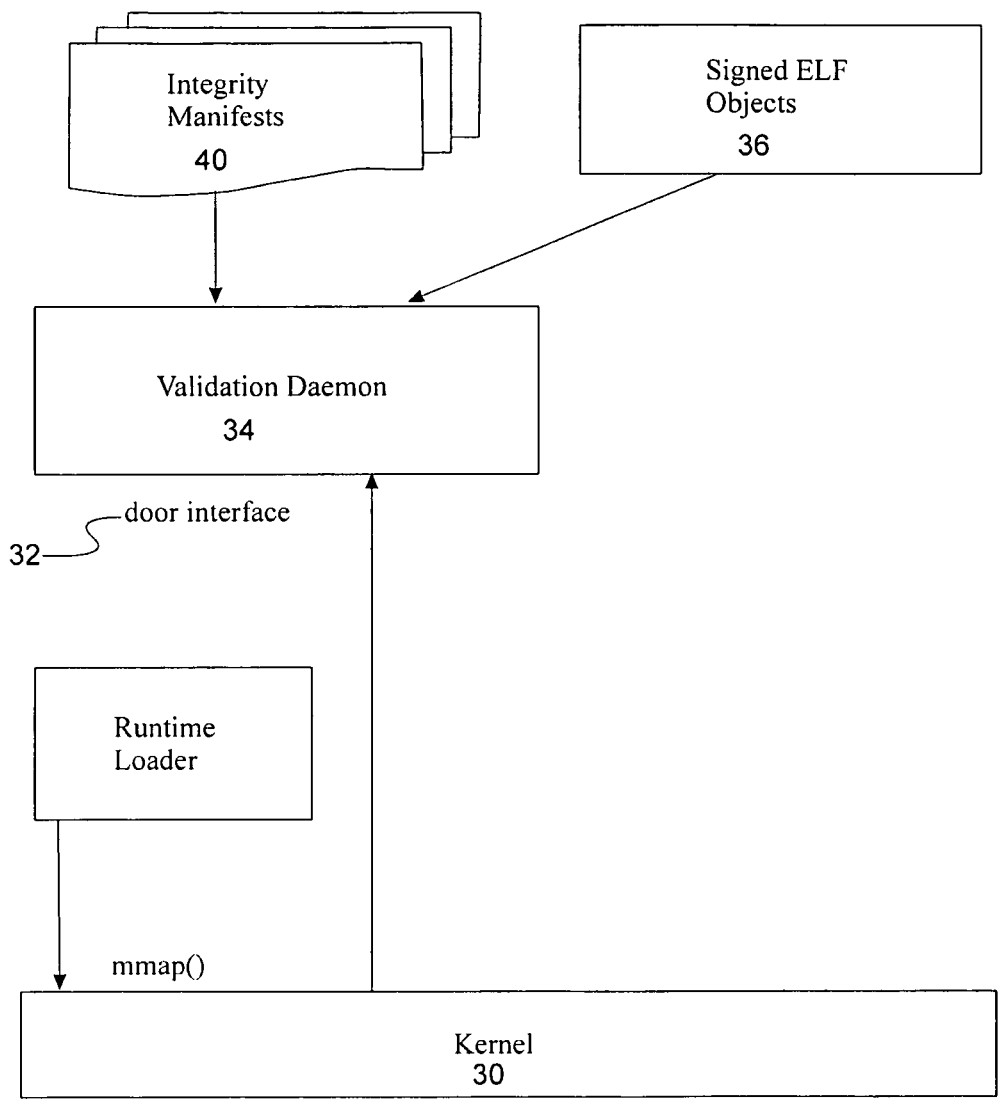
FIG. 3 is a block diagram illustrating the file validation process for Solaris.

With reference to FIG. 3, a block diagram illustrating the file validation process for Solaris is provided. The kernel 30 opens the executable file and then uses a door interface 32 to contact the validation daemon 34 to perform the validation. The daemon validates the requested file either using either files embedded ELF signature 36 or by looking up the file's hash in a table that is initialized by reading the signature manifests 40 installed on computer system 10. Validation failures cause an appropriate error code to be returned.

With reference to the Solaris Operating System, the mprotect( ) system call performs no direct validation. However, the mprotect( ) system call is affected by the maximum permissions set by an earlier mmap( ) call. In a refinement, mprotect( ) is allowed to add PROT_EXEC only in situations where mmap( ) with PROT_EXE would have been allowed. To that end, mmap( ) and mprotect( ) take the following actions: mmap( ) without PROT_EXEC sets the maximum permissions to disallow PROT_EXEC if the unvalidated privilege cap is set to noexec (in addition to the existing reasons). mprotect( ) to add PROT_EXEC follows the rules for unvalidated objects set forth below. This strategy fails if the process's Permitted set exceeds the unvalidated privilege cap. Otherwise, the process's Limit is set intersected with the privilege cap.

In the typical Solaris release, manifests containing file hashes are provided to cover the files contained therein. Manifests are usually stored on the running system in the directory hierarchy rooted at /etc/signedexec/manifest. The directory /etc/signedexec/revocation contains manifests that prevent the validation of any files that match their manifest entries. This provides the administrator with a mechanism to prevent the execution of programs that are later found to contain security vulnerabilities. In a variation of some embodiments, each manifest is stored as an XML file that conforms to the TCG specification for a reference manifest. In a refinement, the file manifest includes a full pathname (for identification only; not used for validation), basic file metadata (e.g., Owner, group, size, permissions), and cryptographic hash of the entire file contents.

As set forth above, the method of some embodiments include a step in which an executable file object is validated. Operating systems utilizing such a step will typically call a module that validates the executable file object. In the Solaris operating system, the kernel validates a file by calling the internal routine signex_validate( ), which sends a request to the validation daemon using a door interface. If the daemon is not available to respond to the request, as is the case early in the boot process before the daemon is started, signex_validate( ) falls back on a boot validation mechanism.

Figure 4:
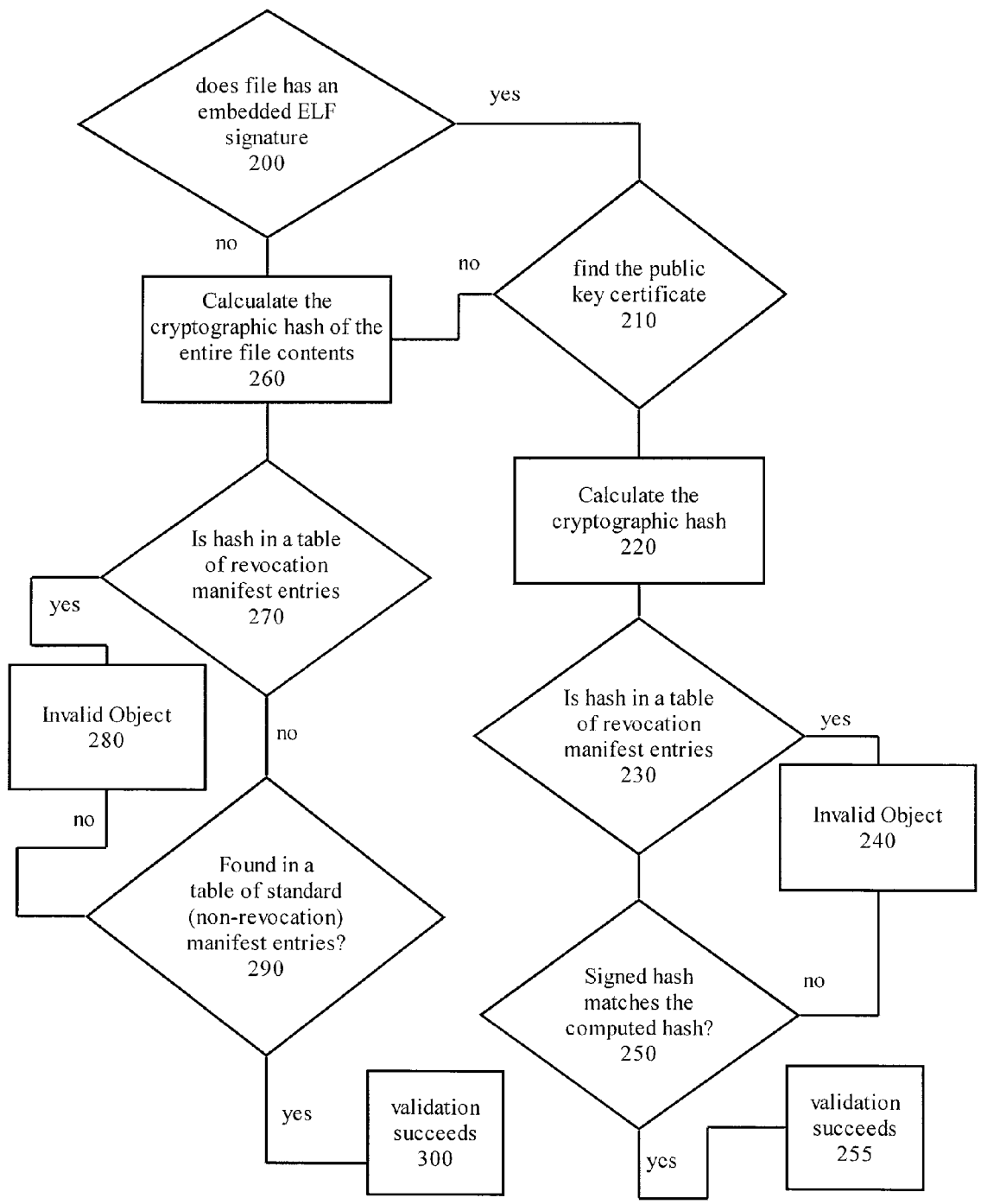
FIG. 4 is a flowchart providing the steps of a typical validation request.

With reference to FIG. 4, a flowchart providing the steps of a typical validation request is provided. In Box 200, a determination is made if the file has an embedded ELF signature. If the file does have an embedded signature, an attempt to find the public key certificate referenced in the embedded ELF signature section is made (Box 210). If the certificate is not available, this method proceeds the step of item Box 260 described below. If the certificate is available, the validation method proceeds to the step described by item Box 220 in which the cryptographic hash of only the loadable ELF sections is calculated. In the decision step provided by decision Box 230, a search for the hash in a table of revocation manifest entries is performed. If a match is found, the validation fails (Box 240). If a match is not found, the embedded signature of the hash is verified (Box 250). If the signed hash matches the computer hash, the validation succeeds (Box 255). If the signed hash does not match the computer hash, the validation fails (Box 240).

Still referring to FIG. 4, if the file does not have an embedded ELF signature or if the file does not have a public certificate, the cryptographic hash of the entire file contents is calculated (Box 260). In the decision step provided by decision Box 270, a search for the hash in a table of revocation manifest entries is performed. If a match is found, the validation fails (Box 280). Finally, the hash is looked up in a table of standard (non-revocation) manifest entries (Box 290). If a match is found, the validation succeeds (Box 300). If a match is not found, the validation fails. (Box 280).

In the special Solaris case of setuid or setgid exec( ) operation that changes the execution context of the process, the validation request includes a flag to require verification of the file's owner, group, and mode as well as contents hash. In this case, the validation is performed using the manifest table lookup (step 2 above) even if the file contains an embedded ELF signature. The file's owner, group, and mode must match those in the manifest entry, if present, or the validation fails.

The algorithm of FIG. 4 results in one of three possible outcomes for a given file object:

Valid: Loading and execution of the file object proceeds as requested.

Invalid: The file explicitly fails validation, either because of a revocation entry or because there was a mismatch of file ownership or permissions during a setid execution.

Unvalidated: There is insufficient information for the validation to explicitly succeed or fail.

In another variation of some embodiments, different trust anchors (i.e. different certificates trusted to sign manifests) in different zones are provided. Therefore the validation results may be different for different zones. When a single file is mounted in multiple zones using lofs mounts, the validation results must be cached separately on the lofs vnodes and the underlying real vnode.

In a further refinement, each validation result includes a generation number. For the real vnode, the generation number is incremented whenever the file is written. For lofs mounts, the cached generation number matches the generation number of the underlying real vnode when the validation was performed. Before using the cached validation result from a lofs vnode, the system must verify that the generation number in the lofs vnode still matches the underlying vnode.

A number of system calls are implemented during implementation of the method of some embodiments. With respect to Unix-like operating systems such as Solaris, a new signed exec( ) system call provides the operations in Table 1 for use by the validation daemon. Each of these operations requires the sys_admin privilege.

TABLE 1

Exec( ) related operations requiring system administrator privilege.

| Operation | Description |
| --- | --- |
| Enable or disable validation | This is a zone-wide setting to enable or disable automatic validation of files upon execution. |
| Flush validation cache | The kernel removes cached validation results from all vnodes. |
| Set privilege cap | Set the maximum privilege set used for unvalidated executables. See the Administration section for details about how this privilege set is used. |

TABLE 1-continued

Exec( ) related operations requiring system administrator privilege.

| Operation | Description |
| --- | --- |
| Register door interface | Provide a file descriptor for the door used to communicate with the validation daemon. |

The signed exec( ) system call also includes the unprivileged operations set forth in Table 2.

TABLE 2

Exec( ) related operations not requiring system administrator privilege.

| Operation | Description |
| --- | --- |
| Get privilege cap | Return the current value of the unvalidated privilege cap. |
| Validate a file | Attempt to validate a file object as if it were being loaded for execution and return the result. |

An SMF (Service Management Facility) refresh operation will cause the validation daemon to reload its manifests. This is useful when manifests are added or removed from the system. The refresh operation also results in flushing the validation cache and setting the unvalidated privilege cap.

In another variation of some embodiments, administration is accomplished by manipulating the state and property values associated with the SMF signedexec service. This service exists in both global and non-global zones; enabling or disabling the service determines whether automatic validation of files is active in the zone. When the enabled state of the signedexec service changes, the SMF start or stop method notifies the kernel using the signedexec( ) system call. In the global zone, it also adds or deletes the file /etc/signedexec/disable in the boot archive so that the kernel can determine whether to validate files early in the boot process.

A validation daemon runs in the global zone whenever the signedexec service is enabled. In a non-global zone, a separate instance of the validation daemon is started if the service is enabled and the use_global_settings service property is set to false. When this property is set to true, validation requests within the non-global zone are handled by the daemon running in the global zone, and other property settings are ignored.

The unvalidated_privilege_cap property determines the maximum privilege set available to an executable that fails validation. This property is ignored in a non-global zone if use_global_settings is set to true.

Certificates used to verify manifest signatures are stored in the /etc/certs directory. This collection of certificates determines the set of entities that are trusted by the system administrator to sign manifests and executables. When the validation daemon runs in a non-global zone, it uses certificates stored in the /etc/certs directory within the zone's root file system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A non-transitory computer-readable storage medium comprising instructions, which when executed by one or more processors during a computer boot, cause the one or more processors to perform the steps of:
   receiving a request from a target process to access an executable file object, the executable file object being encoded in a computer readable medium;
   associating the executable file object with a digital signature constructed from a one-way hash of the executable file object contents encrypted with an asymmetric cryptographic private key;
   decrypting the hash value using a public key;
   determining if the executable file object is validated or unvalidated based at least in part on a hash of the file object contents embedded in the executable file object, determination of a file object being validated includes determining if the executable file object has changed since its last execution such that a modified file object will fail to start;
   comparing the hash to a table of revocation manifest entries;
   determining that the executable file object is unvalidated if the table contains a matching hash entry; and
   if the executable file object is unvalidated, allowing the target process to execute the executable file object if a privilege cap allows execution of an unvalidated object.

2. The computer-readable storage medium of claim 1 wherein the target process is associated with a permitted privilege set, the permitted privilege set including a second set of privileges.

3. The computer-readable storage medium of claim 1 wherein the target process is denied access to the privilege cap if any privilege in a permitted privilege set is not included in the privilege cap and if the executable file object is unvalidated.

4. The computer-readable storage medium of claim 1 wherein the target process is associated with a limit privilege set, the limit privilege comprising a third set of privileges that can never be exceeded by the target process.

5. The computer-readable storage medium of claim 4 wherein if the executable file object is unvalidated, the target process executes the executable file object with a limit privilege set that is an intersection of a prior value of the target process's limit privilege set and the privilege cap.

6. A method for controlling access to an executable file object by a target process executing on a computer system having a privilege cap including a first set of privileges, the method comprising:
   receiving a request from the target process to access the executable file object, the target process having an associated second set of privileges, the executable file object being encoded in a computer readable storage medium;
   determining if the executable file object is validated or unvalidated based at least in part on a digital signature constructed from a one-way hash of the file object contents encrypted with an asymmetric cryptographic key, the digital signature being embedded in the executable file object;
   comparing the hash to a table of revocation manifest entries;
   determining that the executable file object is unvalidated if the table contains a matching hash entry; and
   if the executable file object is unvalidated, denying access by the target process to the executable file object if the privilege cap includes a parameter that prohibits access to unvalidated file objects, denying access by the target process to the executable file object if any privilege of the second set of privileges exceeds privileges of the first set of privileges, and limiting access to the executable file object based on the first and second sets of privileges otherwise, wherein limiting access includes determining an intersection set of the first and second sets of privileges and applying the intersection set of privileges to any second executable file object accessed by the executable file object; and
   if the executable file object is validated, allowing access to the executable file object.

7. The method of claim 6, wherein limiting access by the target process to the executable file object comprises determining whether any privilege in the second set of privileges is not included in the first set of privileges.

8. The method of claim 6, wherein the executable file object comprises an embedded digital signature, and wherein determining if the executable file object is validated or unvalidated comprises calculating a cryptographic hash and comparing the cryptographic hash to the embedded digital signature.

* * * * *

UNITED STATES PATENT AND TRADEMARK OFFICE
CERTIFICATE OF CORRECTION

PATENT NO. : 8,856,938 B2  
APPLICATION NO. : 12/182790  
DATED : October 7, 2014  
INVENTOR(S) : Dik et al.

Page 1 of 1

It is certified that error appears in the above-identified patent and that said Letters Patent is hereby corrected as shown below:

On the Title Page, column 1, under Inventors, item 75, line 4, delete "Joep J Vesseur," and insert -- Joep J. Vesseur, --, therefor.

In drawings, 4 of 4, in figure 4, under Referral Number 260, line 1, Delete "Calcualate" and insert -- Calculate --, therefor.

Signed and Sealed this  
Twenty-eighth Day of April, 2015

Michelle K. Lee  
*Director of the United States Patent and Trademark Office*